United States Patent [19]
Kitamura et al.

[11] 3,716,452
[45] Feb. 13, 1973

[54] LYSIS OF YEAST CELL WALLS

[75] Inventors: Kunpei Kitamura; Tatsuhiko Kaneko; Yasushi Yamamoto; Yoshiro Kuroiwa, all of Takasaki-shi, Japan

[73] Assignee: Kirin Beer Kabushiki Kaisha, a.k.a., Kirin Brewery Co., Ltd., Tokyo, Japan

[22] Filed: Sept. 17, 1970

[21] Appl. No.: 73,061

[52] U.S. Cl. ............................195/2, 195/2, 195/65, 195/62
[51] Int. Cl. ..........................C12d 13/10, A23j 1/18
[58] Field of Search.....................195/62, 65, 66, 2, 4

[56] References Cited

UNITED STATES PATENTS 3,330,738   7/1967   Napier................................195/66 R

OTHER PUBLICATIONS

Tanaka et al., Journal of Bacteriology June 1965 Vol. 89, pgs. 1570 to 1580.
Monreal et al., Archives Biochemistry and Biophysics Vol. 126, pp. 960–962 (1968).
Ensign et al., Journal of Bacteriology Vol. 90, pgs. 395–402 (1965).

*Primary Examiner*—Lionel M. Shapiro
*Attorney*—Holman & Stern

[57] ABSTRACT

An enzyme which is capable of lysing yeast cell walls is produced by microorganisms belonging to Arthrobacter luteus nov. sp. The enzyme has a unique activity for lysing cell walls of yeast dead or alive and in any stage of growth.

16 Claims, No Drawings

LYSIS OF YEAST CELL WALLS

BACKGROUND OF THE INVENTION

This invention relates generally to a novel enzyme which is produced by Arthrobacter luteus nov. sp., and which is capable of lysing yeast cell walls.

This invention also relates to a method of lysis of yeast cell walls with an enzyme produced by Arthrobacter luteus nov. sp.

Many kinds of yeast are produced for food, feed and other industrial purposes, surplus yeast from brewery being one of them.

As the availability of yeast cell inclusion is considered to be increased by removal of yeast cell walls, various methods for removal of yeast cell walls have been proposed. Among them, enzyme treatment is believed to have more advantages than the drastic physical and chemical treatments, e.g., heat-, concentrated acid-, and concentrated alkali-treatments, because the former protects yeast cell inclusion form remarkable destruction.

The digestive juice of the snail Helix pomatia, enzymes produced by Brevibacterium lyticum nov. sp., and enzymes produced by Streptomyces species are known as the agents capable of lysing yeast cell walls enzymically.

The methods for lysing yeast cell walls by these enzyme preparations mentioned above are effective only within a certain limitation, and they are not considered to be satisfactory because of certain defects. For example, high enzyme concentration, relatively high reaction temperature, selection of growth stage of yeast and/or pre-treatment of yeast cells with thio-compounds such as mercaptoethanol are required to lyse the cell walls of viable yeasts effectively. Further, these microorganisms readily lose their capability of producing the enzyme.

SUMMARY OF THE INVENTION

It is an object of this invention to provide a method that overcome these defects.

It is another object of the invention to provide a method for enzymically lysing walls of yeast cells, in which an enzyme produced by Arthrobacter luteus nov. sp. is employed.

It is a further object of the invention to provide an enzyme which is produced by Arthrobacter luteus nov. sp. and which is capable of lysing yeast cell walls.

According to the present invention in one aspect thereof, briefly summarized, there is provided a method for lysis of yeast cell walls which comprises exposing said yeast cell walls to an enzyme produced by Arthrobacter luteus nov. sp.

According to the present invention in another aspect thereof, briefly summarized, there is provided an enzyme which is produced by Arthrobacter luteus nov. sp. and which is capable of lysing yeast cell walls.

In view of the foregoing considerations, we have made an effort to obtain an enzyme which lyses yeast cell walls at any growth stage without any pre-treatment, as a result, have developed this invention based on our discovery that Arthrobacter luteus nov. sp. produces an enzyme which lyses yeast cell walls readily without any treatment.

As this enzyme can be applied to not only dead yeast but also viable yeast at any growth stage and can be produced readily by the organism in a simple medium such as that containing yeast cells only, this enzyme is believed to have many industrial advantages. Further, this enzyme has lytic activity also with respect to the yeast cell walls separated from the cell contents whereby it can be used to treat waste yeast cell walls into lower molecular materials or liquids.

DETAILED DESCRIPTION OF THE INVENTION

Characteristics of Arthrobacter luteus nov. sp. for producing the enzyme according to the invention are as follows:

Description of Arthrobacter luteus nov. sp.

Rods, 0.6 to 1.0 by 0.8 to 10.0 micra. Pleomorphic. Curved, swollen, club-shaped cells and rudimentary branching of cells are observed. In old cultures, the cells become short rod form or coccoid form, measuring 0.6 to 0.8 by 0.8 to 1.0 micra and sometimes irregular in shape. Cystites are observed when cultured at 37°. Spore not formed. Gram-positive in young cultures. In old cultures, gram-negative cells which sometimes include gram-positive granules are observed besides gram-positive cells. Non-acid-fast. Non-motile.

Nutrient agar colonies: Circular, smooth, entire, raised, glistening, yellow, butyrous. In old cultures, filamentous deep colonies are observed.

Glutamate agar colonies: Growth scant, circular, smooth, filamentous, flat, white, opaque. The colonies develop little better in the medium than on the surface of the medium.

Nutrient agar slant: Growth moderate, filiform, glistening, smooth, yellow. In old cultures, the edge becomes filamentous.

Glutamate agar slant: Growth scant, plumose, white, opaque, medium unchanged.

Nutrient broth: Moderate turbidity with yellow sediment, no pellicle.

Nutrient gelatin stab: Slow liquefaction.

B.C.P. milk: Acid, coagulation.

Nitrite produced from nitrate.

Indole not produced.

Hydrogen sulfide not produced.

Starch hydrolyzed.

Methyl Red test: Weakly positive.

Voges-Proskauer test: Negative.

Ammonia not produced from peptone.

Potato: Moderate growth, yellow.

Acid but no gas from arabinose, xylose, glucose, mannose, fructose, galactose, lactose, maltose, saccharose, trehalose, sorbitol, glycerol, salicin, $\alpha$-methylglucoside, inulin, dextrin, and starch. No acid and no gas from mannitol, raffinose, rhamnose, and inositol.

Succinate is utilized as a sole carbon source but citrate is not utilized.

Paraffin is utilized but phenol or m-cresol is not utilized.

Urease slightly produced.

Cellulose not attacked.

Blue pigment is not produced on nicotin agar slant.

NaCl broth: Good growth up to 7 percent NaCl, growth in a few cases in 8 percent.

Optimum temperature for growth: 30° to 37°. No growth at 52°.

Optimum pH for growth: Between 7.0 and 8.0.

Catalase: Positive.
Did not survive for 10 min. at 72° in skimmed milk.
Facultatively anaerobic.
Source: Brewery sewage.

The organism differs from Brevibacteriaceae, Lactobacillaceae, Propionibacteriaceae, Listeria or Erysipelothrix, which are considered to bear some similarities to the organism, in branching, reduction of nitrate, gas production, motility, or catalase reaction. It also differs from Corynebacterium, Microbacterium or Cellulomonas, which are considered to be closely related to the organism, in that it has bending type cell division and does not have metachromatic granule or cellulase activity. From these characteristics, the organism seems to belong to the genus Arthrobacter described in Bergey's Manual (7th edition).

In the genus Arthrobacter, the organism was considered to be similar to A.oxydans and A.aurescens in that it utilizes nitrate and ammonium slats, hydrolyzes starch, and reduces nitrate, but it was found to be different from the two species in the following characteristics.

|  | A.luteus nov. Sp. | | A.oxydans | | A.aurescens | |
|---|---|---|---|---|---|---|
| Nutrient broth | Moderate growth, Yellow sediment | | Abundant growth, ring, white sediment | | Moderate growth, cream-colored sediment | |
| Glutamate agar slant | Plumose, white | | Filiform, white | | Filiform, yellow | |
| Nicotin agar slant | Scanty growth white | | Abundant growth, blue pigment | | Growth slow and spare | |
| Litmus milk | Acid, coagulation | | Slow peptonization, alkaline | | Pale yellow ring, alkaline | |
| Hydrogen Sulfide | Not produced | | Not produced | | Produced | |
| Fermentability | Acid | Gas | Acid | Gas | Acid | Gas |
| Arabinise | + | − | − | − | − | − |
| Xylose | + | − | − | − | − | − |
| Glucose | + | − | + | − | ± | − |
| Mannose | + | − | − | − | − | − |
| Fructose | + | − | + | − | − | − |
| Galactose | + | − | − | − | − | − |
| Lactose | + | − | − | − | − | − |
| Maltose | + | − | − | − | − | − |
| Saccharose | + | − | + | − | ± | − |
| Mannitol | − | − | − | − | − | − |
| Glycerol | + | − | − | − | − | − |
| Inulin | + | − | − | − | − | − |
| Starch | + | − | − | − | − | − |
| Optimum temp. for growth (°C) | 30–37 | | 25 | | 20–32 | |
| Source | Brewery sewage | | Tobacco leaves | | Soil | |

+: Produced,
±: slight production,
−: not produced

The organism was, therefore, regarded as a new species and the name Arthrobacter luteus was proposed for it.

The organism is deposited with American Type Culture Collection (ATCC), U. S. A., on Aug. 31, 1970, and assigned ATCC No. 21606.

Further characteristics of the organism are reported in "The Journal of General and Applied Microbiology" vol. 15, No. 3 pages 317 to 326 (1969, Tokyo).

The yeast cell wall lytic enzyme produced by this organism can be obtained by various methods generally applied to obtain microbial exo-enzymes by cultivation of microorganisms provided that the cultivation medium contains biotin and a glucose polymer having a $\beta$-1,3 linkage.

Such a cultivation medium can be obtained as a medium which comprises yeast cells or the content thereof containing these substances, or by adding these substances or materials containing these substances to a certain cultivation medium prior to cultivation or during cultivation.

In one embodiment of the present invention, the cultivation medium is obtainable by adding, to a base medium, biotin or a biotin-containing material such as yeast cell, yeast extract or waste molasses in the case where the base medium contains no biotin, and, further, a glucose polymer having a $\beta$-1,3 linkage or a material containing the glucose polymer such as yeast cells, yeast cell walls, or extract of Poria Cocos, Eisenia Bicyclis or Laminaria Hyperborea. As this base medium, any conventional cultivation medium such as (1) a conventional culture medium containing magnesium sulfate and potassium phosphate such as meat extract medium, peptone medium or yeast extract medium, or as (2) a totally-synthesized or a partially-synthesized cultivation medium containing a carbon source, nitrogen source, inorganic salt source, and thiamine can be employed. A medium comprising yeast cells or contents thereof can, of course, contain carbohydrates, nitrogen compounds, metal salts or other inorganic salts and/or vitamins added.

The pH value of a medium containing biotin and the glucose polymer is adjusted alkaline, below pH 10.5 and the medium is sterilized. The broth of Arthrobacter luteus pre-cultured in the same or the generally known medium for bacterial growth, for example, meat extract medium, is inoculated into the medium and cultivation is conducted at 10°–45° C, preferably 30°–35° C for 8 – 120 hours within a pH range of 5.0 – 9.5 with aeration and/or agitation or shaking. It is desirable that the pH of the culture broth is maintained alkaline throughout the cultivation period.

The enzyme produced can be separated from the broth by the methods generally known in enzymology, if required.

In this invention, both (I) the culture broth and (II) some products obtained by certain treatment of the culture broth can be used to lyse yeast cell walls. Examples of these products (II) include: (a) culture liquids free from bacterial cells, (b) crude enzyme precipitates or enzyme powders obtained by precipitation of enzyme fraction with an agent capable, in general, of causing an enzyme to deposit from the solution thereof such as inorganic slats, for example, ammonium sulfate, or water soluble organic solvent, for example, ethyl alcohol and acetone, (c) aqueous or buffered solutions of the enzyme powder, and (d) active fractions obtained by any procedures which can be used for partitioning or isolating enzymes such as gel filtration or ion exchange method.

The enzyme of the present invention purified by the procedure described above or an active fraction of the culture broth shows that it is a single enzyme protein and is characterized by its unique ability to lyse yeast cell walls. The enzyme is believed novel, and the name Zymolyase is proposed therefor.

The lytic activity of the novel enzyme can sometimes be enhanced when it is used with certain enzyme such as a glucanase or a protease. The present enzyme which has not yet been purified contains such an auxiliary enzyme produced by Arthrobacter luteus nov. sp. and accordingly is sometimes more active than the purified enzyme.

In order to lyse yeast cell walls by means of the novel enzyme, various methods can be used. For example, the enzyme solution is added to 0.1 – 5 percent of aqueous or buffered suspension of yeast cells of pH 4.0 – 12.0, preferably pH 7.0 – 7.5 and the mixture is incubated at 15° – 45°C, preferably 30° – 40°C for sufficient time to lyse the yeast cell walls, for example, for 0.1 – 5 hours with stirring, whereupon yeast cells, dead or alive, are lysed very readily. The yeast cells to be treated may be in any stage of growth, and yeast cells pre-treated with chemicals or heat may also be used in the present method.

The enzyme used in this invention has its optimum pH between 7.0 – 7.5 and is relatively stable at pH values in the range of 6.0 – 11.0. The enzyme loses its activity by incubation at 60° C for 5 minutes, and its activity is inhibited by such protein denaturating agents as mercuric chloride, sodium laurylbenzensulfate, and silver nitrate.

The degree of yeast cell wall lysis is estimated as described below. One ml. of enzyme solution, 3 ml. of brewery yeast aqueous suspension (5 mg. dry matter/ml.), 5 ml. of $M/15$ phosphate buffer (pH 7.5), and 1 ml. of water are mixed together, and incubated at 25° C for 2 hours with stirring. Optical density (O.D.) at 800 m$\mu$ of the reaction mixture is determined. In a reference mixture the enzyme solution in the above reaction system is replaced by 1.0 ml. of water. Percent of O.D. reduction caused by lysis of yeast cell walls is calculated according to the following equation.

% of O.D. reduction

= (O.D. of the reference - O.D. of reaction mixture)/(O.D. of the reference) × 100

As percent of O.D. reduction is in proportion to the enzyme concentration within a range of 0 – 60%, the enzyme solution must be diluted to the range cited above for accurate determination if the lytic activity is too high.

After the cell walls are completely digested, only 70 percent of O.D. reduction is generally observed because of the presence of the cytoplasmic inclusions. Although small variations are observed in this value depending on the yeast strains used, 70 percent of O.D. reduction is calculated as 100 Degree of Yeast Cell Wall Lysis. This designation "Degree of Yeast Cell Wall Lysis" will be used in the following examples. It is understood that these examples are presented as illustrative and that it is not intended thereby to limit the scope of the invention.

Example 1

Arthrobacter luteus pre-cultured in meat extract medium for one day is inoculated into the medium shown in Table 1 and cultured at 30° C for 24 hours with shaking. The resultant culture broth is subjected to centrifugation.

TABLE 1

| | |
|---|---|
| Lyophilized brewery yeast | 3.0 g. |
| K$_2$HPO$_4$ | 0.1 g. |
| MgSO$_4$·7H$_2$O | 0.1 g. |
| Water | 100 ml. |
| (pH 8.5) | |

As shown in Table 2, viable yeast cells of various strains are lysed after incubation with the supernatant.

TABLE 2

| Yeast Strain | Degree of Yeast Cell wall Lysis |
|---|---|
| Saccharomyces carlsbergensis | 40 |
| Saccharomyces cerevisiae | 48 |
| Saccharomyces ellipsoideus | 40 |
| Saccharomyces pastorianus | 104 |
| Saccharomyces turbidans | 50 |
| Brewery yeast | 97 |
| Sake yeast (Kyokai-6 go) | 121 |
| Baker's yeast | 51 |
| Endomycopsis capsularis | 83 |
| Saccharomycodes ludwigii | 111 |
| Nematospora coryli | 63 |
| Lipomyces starkeyi | 11 |
| Candida utilis | 40 |
| Torulopsis colliculosa | 44 |
| Brettanomyces anomalus | 59 |

Example 2

Bottom fermenting brewery yeast is inoculated into wort and cultured at 23.5° C. After 48, 72, 96 and 144 hours of incubation, portions of the culture broth are withdrawn and centrifuged to obtain yeast cells at various stages. After washing with water, the yeast cells are suspended in water (5 mg. dry matter/ml.). These yeast cell suspensions are incubated with the supernatant obtained in Example 1., and the Degree of Yeast Cell Wall Lysis is estimated in each case.

The results are shown in Table 3. Here, the cells of 48, 72, 96 and 144 hours culture correspond to the cells at middle logarithmic phase, late logarithmic phase, early stationary phase and stationary phase, respectively.

TABLE 3

| Culture period (in hours) | Degree of Yeast Cell Wall Lysis |
|---|---|
| 48 | 100 |
| 72 | 97 |
| 96 | 99 |
| 144 | 94 |

Example 3

Arthrobacter luteus pre-cultured for one day in the culture medium shown in Table 4 is inoculated into the same medium and cultured at 30° C for 2 days with shaking.

TABLE 4

| | |
|---|---|
| Yeast glucan | 0.5 g. |
| Yeast extract | 1.0 g. |
| MgSO$_4$·7H$_2$O | 0.1 g. |
| Water | 100 ml. |
| (pH 8.5) | |

The resultant culture broth is subjected to centrifugation. Two ml. of the supernatant, 3 ml. of brewery yeast suspension (5 mg. dry matter/ml.), and 5 ml. of M/15 phosphate buffer (pH 7.5) are mixed together, and incubated at 25° C for 3 hours with stirring. The Degree of Yeast Cell Wall Lysis is 133 percent.

Example 4

Arthrobacter luteus pre-cultured in meat extract for one day, is inoculated into the culture medium shown in Table 5, and cultured at 30° C for 24 hours with shaking.

TABLE 5

| | |
|---|---|
| Press brewery yeast | 7.0% |
| $NH_4NO_3$ | 0.2% |
| $K_2HPO_4$ | 0.1% |
| $MgSO_4 \cdot 7H_2O$ | 0.1% |
| (pH 9.5) | |

The resultant culture broth is subjected to centrifugation. The supernatant obtained (3.2 l.) is salted out with solid ammonium sulfate with 0.395 saturation. The precipitate harvested by centrifugation is lyophilized to obtain 7.4g of a grayish brown powder. The enzyme solution is prepared by dissolving 0.25 g. of the powder in 100 ml. of M/100 phosphate buffer (pH 7.5). One ml. of the enzyme solution, 3 ml. of brewery yeast suspension (5 mg. dry matter/ml.), 5 ml. of M/15 phosphate buffer (pH 7.5), and 1 ml. of water are mixed together, and incubated at 25° C for 2 hours with stirring. The Degree of Yeast Cell Wall Lysis by the enzyme solution is 91%.

Example 5

Arthrobacter luteus pre-cultured in meat extract medium for one day is inoculated into the medium shown in Table 6, and cultured at 30° C for 24 hours with shaking.

TABLE 6

| | |
|---|---|
| Dry brewery yeast | 2.0% |
| Yeast extract | 0.2% |
| $NH_4NO_3$ | 0.2% |
| $K_2HPO_4$ | 1.0% |
| $MgSO_4 \cdot 7H_2O$ | 0.1% |
| $Fe_2(SO_4)_3 \cdot xH_2O$ | 0.05% |
| (pH 9.5) | |

The resultant culture broth is subjected to centrifugation. The supernatant obtained is salted out with solid ammonium sulfate at 0.395 saturation. The precipitate harvested by centrifugation is lyophilized to obtain a crude enzyme preparation. The crude enzyme preparation is dissolved in a small amount of water and layered on a Sephadex G-100 column. Elution is performed with water. The effluent fractions having lytic activity with respect to viable yeast cells are gathered and concentrated. The concentrate is layered on a CM-cellulose column equilibrated with 1/100 M phosphate buffer (pH 6.0). The absorbed enzyme lysing viable yeast cells is released with 1/100 M phosphate buffer (pH 7.5) containing 0.3 M NaCl. The effluent pattern shows a peak of activity to lyse viable yeast cells coincident with that of protein. This enzyme preparation does not contain the activities of $\beta$-1, 3- and $\beta$-1, 6-glucanase. The enzyme obtained is lyophilized. Homogeneity of the purified enzyme is examined by ultra-centrifugation. The ultra-centrifuge run is made with the enzyme in a 2 percent solution (as protein) of 1/15 M phosphate buffer (pH 7.5). The purified enzyme shows only one peak throughout the duration of a run of 100 min. at 60,000 rev./min.

Example 6

The cell wall preparation obtained by disrupting brewery yeast cells in a Mickle disintegrator is suspended in 1/15 M phosphate buffer. Three ml. of the yeast cell wall suspension and 2 ml. of the enzyme solution are mixed together, and incubated at 25° C. After 15 minutes' incubation, the yeast cell walls are completely lysed.

Example 7

Two glucanase preparations are obtained from the culture broth of Arthrobacter luteus. One (glucanase-1) is not absorbed on a column of cation exchange resin at pH 6.0, and the other (glucanase-2) is absorbed on the same column at pH 6.0 to be released at pH 7.5. The synergistic effect of the enzyme and these glucanase preparations on lysis of viable yeast cells is determined. The results are shown in Table 8.

TABLE 8

| Enzyme | Reaction system | | | | | |
|---|---|---|---|---|---|---|
| Glucanase-1 | O | X | X O | O X | | O |
| Glucanase-2 | X** | O | X O | X O | | O |
| Enzyme according to the present invention | X | X | O X | O O | | O |
| Lysis of *** viable yeast | − | ± | ++ ± | ++ +++ | | +++ |

*O : Addition
**X : No addition
*** −: No lysis 30 : lysis

Example 8

Several carbon sources are added to media containing 1.0 percent of meat extract, 0.2 percent of $NH_4NO_3$, 0.1 percent of $K_2HPO_4$, and 0.1 percent of $MgSO_4 \cdot 7H_2O$. The media are adjusted to a pH value of 9.0 and sterilized. Arthrobacter luteus is inoculated into the media, and cultured at 30° C with shaking.

The activity of yeast cell wall lysis of the culture broth is shown in Table 9.

The activity with respect to viable yeast cells is estimated in this and the following Examples 8 to 11. The activity is determined as described below. 3 ml. of brewery yeast aqueous suspension (5 mg. dry matter/ml.), 6 ml. of 1/15 M phosphate buffer (pH 7.5), and 1 ml. of an enzyme solution are mixed together, and the mixture is incubated at 25° C for the fixed hours and thereafter subjected to a microscopic examination. The activity is expressed by the following symbols:

− no lysis.

+ lysis is observed.

++ much or all of the yeast cell wall is lysed.

TABLE 9

| Carbon source added | $\beta$-1,3 linkage | Activity |
|---|---|---|

| | | |
|---|---|---|
| monosaccharide: | | |
| glucose | no | – |
| mannose | no | – |
| xylose | no | – |
| disaccharide: | | |
| maltose | no | – |
| laminaribiose | yes | ++ |
| cellobiose | no | – |
| gentiobiose | no | – |
| polysaccharide: | | |
| pachyman | yes | ++ |
| laminaran | yes | ++ |
| mannan | no | – |
| dextrin | no | – |
| chitin | no | – |
| starch | no | – |

As is apparent from above the result, remarkable activity is observed only in a medium which contains a glucose polymer containing a β-1,3 linkage.

Example 9

Media are prepared by the addition of various organic-nitrogen sources to media containing 0.5 percent of pachyman, 0.2 percent of NH$_4$NO$_3$, 0.1 percent of K$_2$HPO$_4$, and 0.1 percent of MgSO$_4$·7H$_2$O. The media are adjusted to pH 9.0 and sterilized. Arthrobacter luteus is inoculated into the media, and cultured at 30° C with shaking.

The activity of each culture broth obtained is shown in Table 10.

TABLE 10

| Nitrogen Source Added | Activity |
|---|---|
| Yeast extract | ++ |
| meat extract | ++ |
| peptone (Difco.) | ++ |
| Bacto-Tryptone (Difco.) | ++ |
| Bacto-Casitone (Difco.) | ++ |

Example 10

Media which contain 0.01 percent of glucose, 0.1 percent of asparagin, 0.1 percent of K$_2$HPO$_4$, and 0.1 percent of MgSO$_4$·7H$_2$O, and which contain or do not contain biotin, thiamine and soluble laminarin are prepared and are adjusted to pH 9.0. The media are then inoculated with Arthrobactor luteus and cultured.

The multiplication of the bacterium and the activity of the culture broth observed are shown in Table 11. In the Table 11, the symbols + and − in the column of "-material added" stand for the addition of the material and no addition of the material, respectively.

TABLE 11

| Medium No. | Biotin (20 γ/l) | Thiamine (400 γ/l) | laminaran (0.5%) | Multipli-cation | Activity |
|---|---|---|---|---|---|
| 1 | – | – | + | – | – |
| 2 | – | + | – | ++ | – |
| 3 | – | + | + | +++ | – |
| 4 | + | – | – | + | – |
| 5 | + | + | – | ++ | – |
| 6 | + | – | + | + | + |
| 7 | + | + | + | +++ | ++ |

Example 11

Media which contain 0.01 percent of glucose, 0.2 percent of NH$_4$NO$_3$, 0.1 percent of K$_2$HPO$_4$, 0.1 percent of MgSO$_4$·7H$_2$O, biotin 20 γ/l and thiamine 400 γ/l, and which contain each of the glucose polymers shown in Table 12 added are prepared, adjusted to a pH of 9.0, and sterilized.

Arthrobacter luteus is inoculated into the media and cultured. The activity of the culture broth obtained is shown in Table 12.

TABLE 12

| Carbon source added | Activity |
|---|---|
| laminaribiose | ++ |
| laminaritriose | ++ |
| soluble laminarin | ++ |
| insoluble laminarin | ++ |
| pachyman | ++ |

We claim:

1. An enzyme produced by culturing Arthrobacter luteus nov. sp. ATCC No. 21606 in a medium containing biotin and a glucose polymer having a β-1,3 linkage, said enzyme being characterized in that it is capable of undergoing precipitation from the culture broth by addition of ammonium sulfate at 0.395 saturation, purification by gel filtration, and absorption on a carboxymethyl cellulose column equilibrated with 0.01 M phosphate buffer at pH 6.0 and release from the column with 0.01 M phosphate buffer at pH 7.5 containing 0.3 M sodium chloride and in that it gives a single peak upon ultracentrifugation and has lytic activity against viable and dead yeast cell walls, said lytic activity against yeast cell walls being relatively stable in the range of pH 6.0 − 11.0, being lost after incubation at 60°C for 5 minutes, and being maximum at pH 7.0 − 7.5.

2. The enzyme as claimed in claim 1 in the form of a mixture with glucanase.

3. The enzyme as claimed in claim 2 in which said glucanase is produced by Arthrobacter luteus nov. sp. ATCC No. 21606.

4. A process for producing an enzyme capable of lysing yeast cell walls which comprises cultering the organism Arthrobacter luteus nov. sp. ATCC No. 21606 in a medium which contains biotin and a glucose polymer having a β-1,3 linkage thereby to accumulate in the medium an enzyme thus produced.

5. A process for producing an enzyme as claimed in claim 4 in which the initial pH of the medium is alkaline.

6. A process for producing an enzyme as claimed in claim 4 in which the pH of the medium is maintained in the range between 5.0 to 9.5 during said culturing.

7. A process for producing an enzyme as claimed in claim 6 in which said pH is maintained alkaline.

8. A process for producing an enzyme as claimed in claim 4 in which the medium contains yeast cells as at least a part of the sources of biotin and a polymer having a β-1,3 linkage.

9. A process for producing an enzyme as claimed in claim 4 in which the medium contains the contents of yeast cells as at least a part of the source of biotin.

10. A method for lysis of yeast cell walls which comprises exposing said yeast cell walls to an enzyme produced by cultering Arthrobacter luteus nov. sp. ATCC No. 21606 in a medium containing biotin and a glucose polymer having a $\beta$-1,3 linkage.

11. A method for lysis of yeast cell walls as claimed in claim 10 in which said yeast cell walls are in the form of a constituent of viable yeast and the yeast is caused to contact said enzyme.

12. A method for lysis of yeast cell walls as claimed in claim 10 in which said yeast cell walls are in the form of a constituent of dead yeast and the yeast is caused to contact said enzyme.

13. A method for lysis of yeast cell walls as claimed in claim 10 in which said yeast cell walls are in the form of yeast cell wall material itself.

14. A method for lysis of yeast cell walls as claimed in claim 10 in which said enzyme is in the form of a culture broth obtained by culturing of Arthrobacter luteus nov. sp. ATCC No. 21606.

15. A method for lysis of yeast cell walls as claimed in claim 10 in which said enzyme is in the form of a filtrate or a supernatant of the culture broth.

16. A method for lysis of yeast cell walls as claimed in claim 10 in which said enzyme is in the form of a dry powder.

* * * * *